United States Patent [19]

Baker

[11] 4,088,938

[45] May 9, 1978

[54] ELECTRONIC APPARATUS FOR POSITIONING AND USING AC MOTORS

[75] Inventor: Robert L. Baker, Newberg, Oreg.

[73] Assignee: Vapor Corporation, Niles, Ill.

[21] Appl. No.: 751,642

[22] Filed: Dec. 17, 1976

[51] Int. Cl.² ............................................. G05B 13/00
[52] U.S. Cl. .................................... 318/561; 318/612; 318/616; 318/203 R
[58] Field of Search .................... 318/203 R, 227, 561, 318/592, 599, 612, 615, 616

[56] References Cited

U.S. PATENT DOCUMENTS

| | | | |
|---|---|---|---|
| 3,470,428 | 9/1969 | Gill et al. | 318/612 X |
| 3,742,327 | 6/1973 | Nettles | 318/615 X |
| 3,777,122 | 12/1973 | Borsboom | 318/615 X |
| 4,025,839 | 5/1977 | Maury | 318/561 X |

*Primary Examiner*—Gene Z. Rubinson

*Attorney, Agent, or Firm*—Hill, Gross, Simpson, Van Santen, Steadman, Chiara & Simpson

[57] ABSTRACT

A solid-state valve actuator control system using three-phase AC motors as prime movers having a summing point with a set point input, a position feedback input and a velocity feedback input. Velocity feedback being produced by differentiating position feedback. Summing point output error signal provides input to each of three integrators. Integrator outputs, synchronized with the three-phase AC power input, supply control signals to an AC solid-state power bridge having as its power input three-phase AC and as its power output controlled three-phase AC to drive three-phase AC motors in the proper direction. For small errors, the AC drive supplied to the prime mover is proportional to the magnitude of the error. For large errors, full voltage is applied to the prime mover. Motor transients are minimized by the proportional band on start-up and on motor reversal.

12 Claims, 9 Drawing Figures

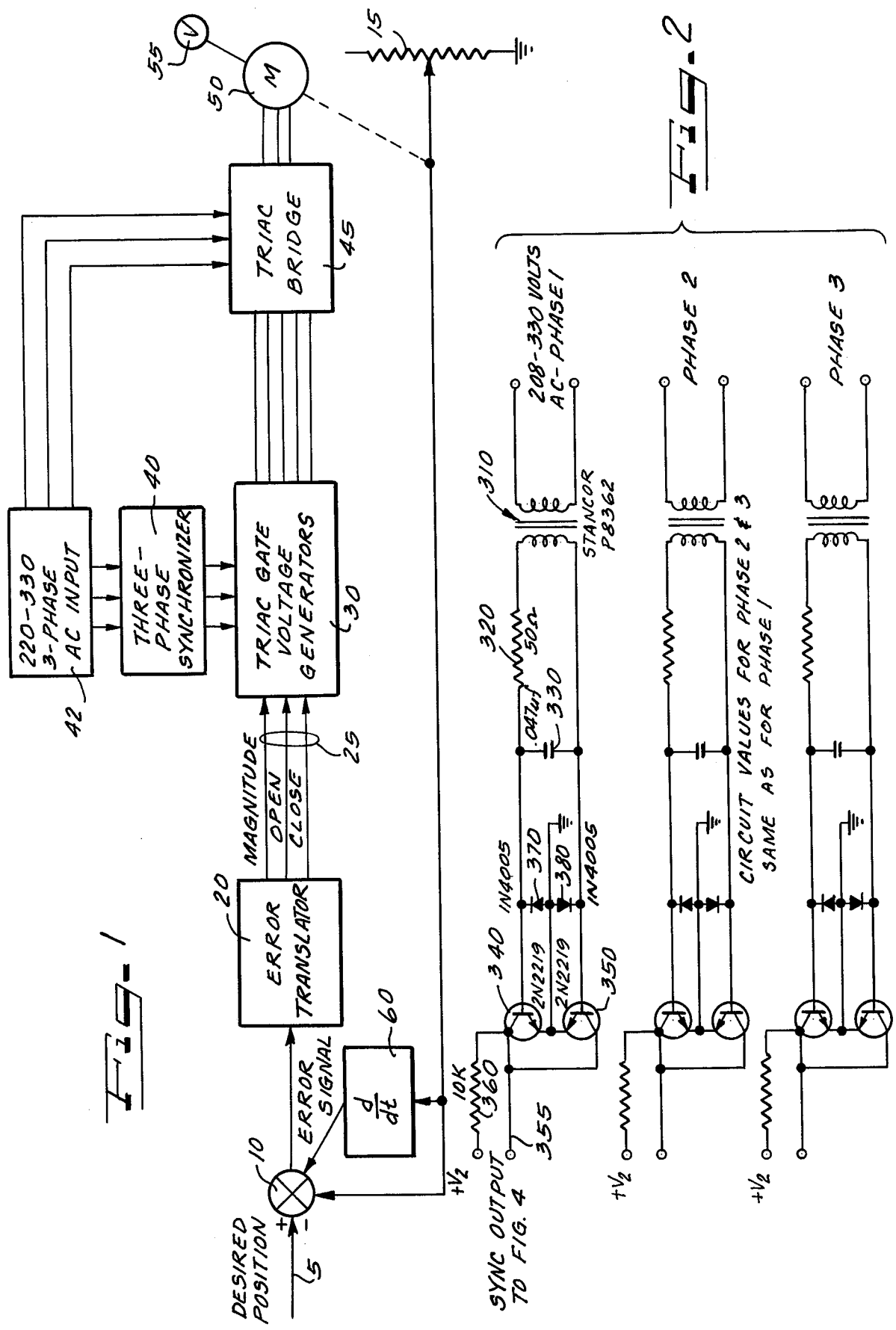

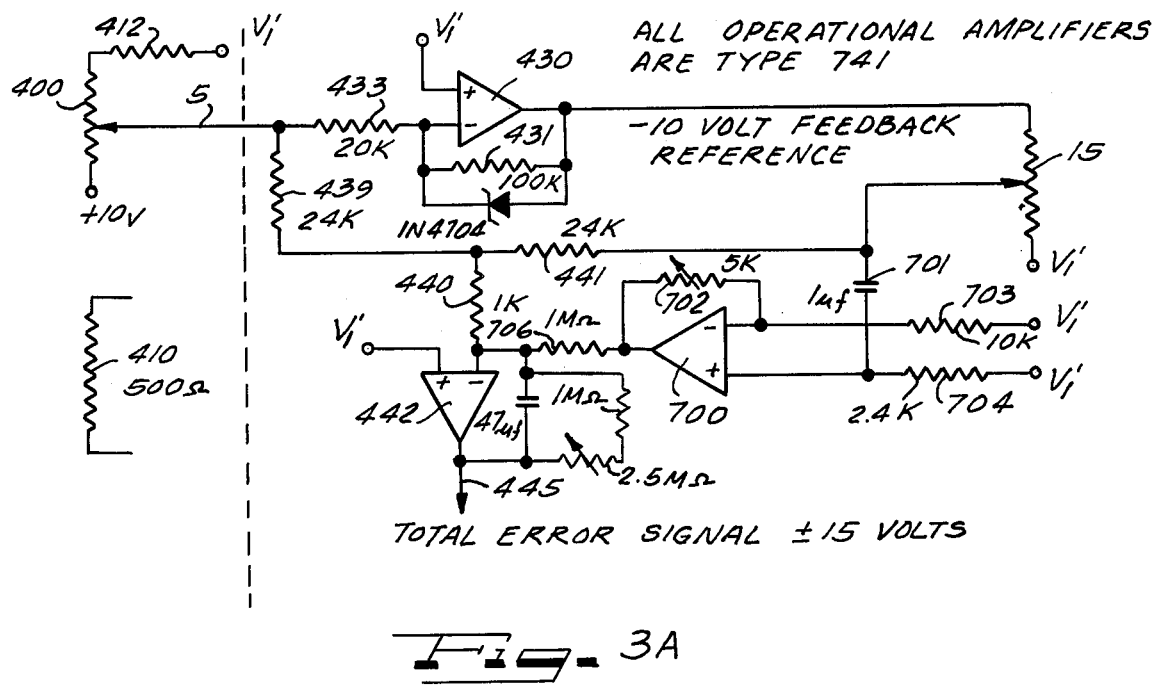
Fig. 3A
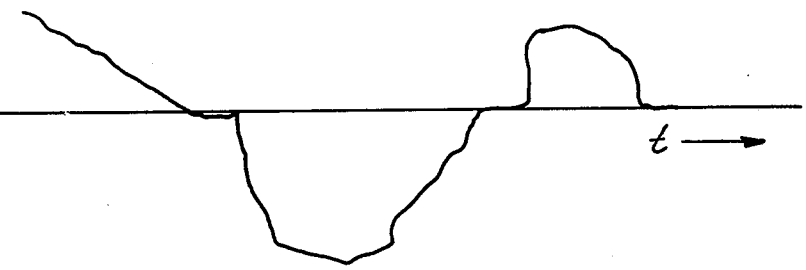
Fig. 3C
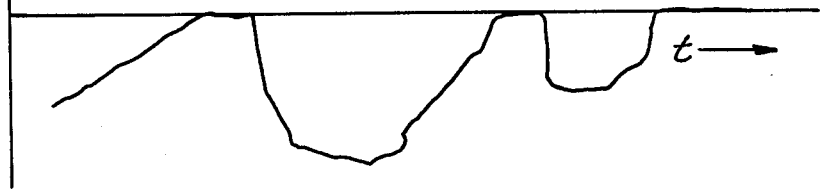

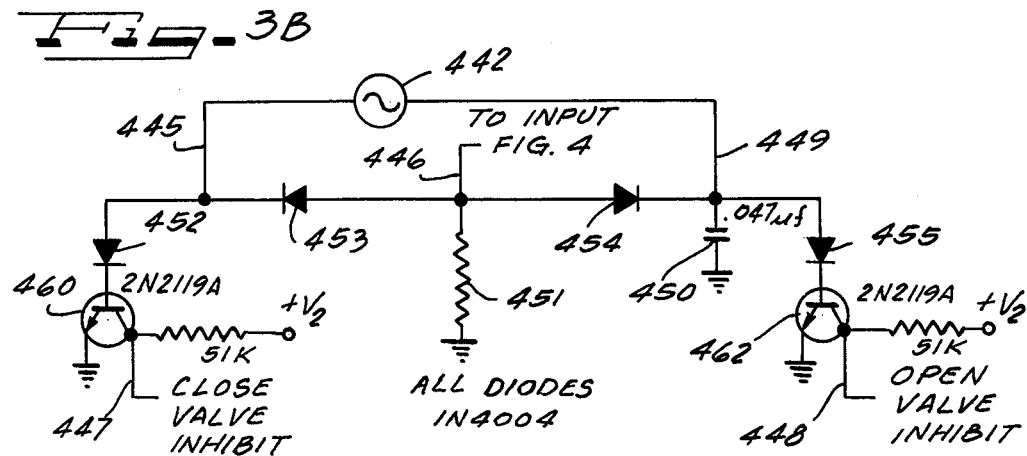
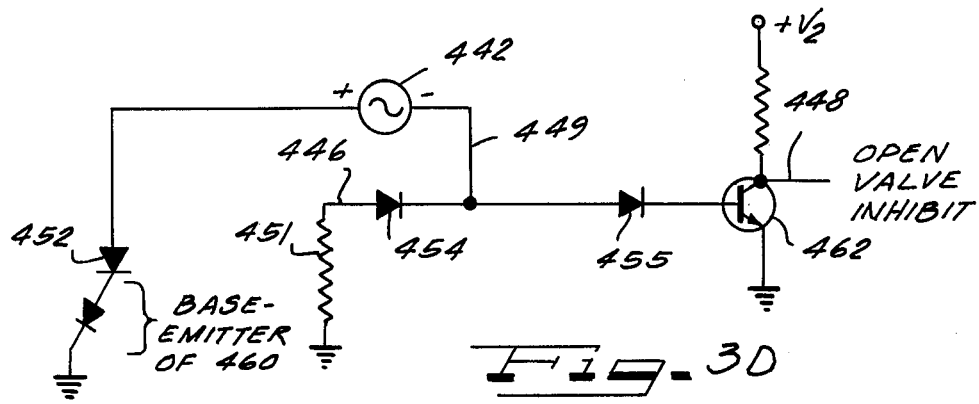
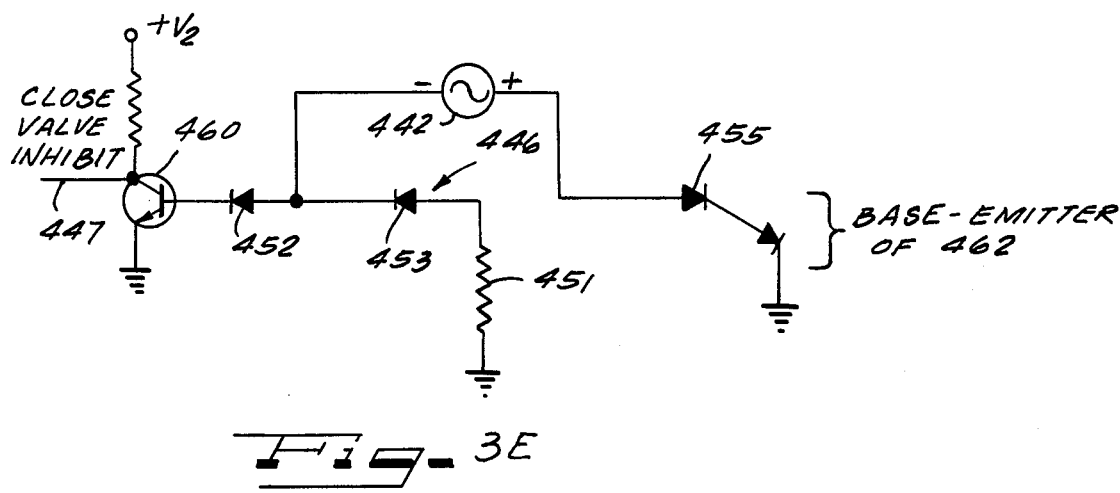

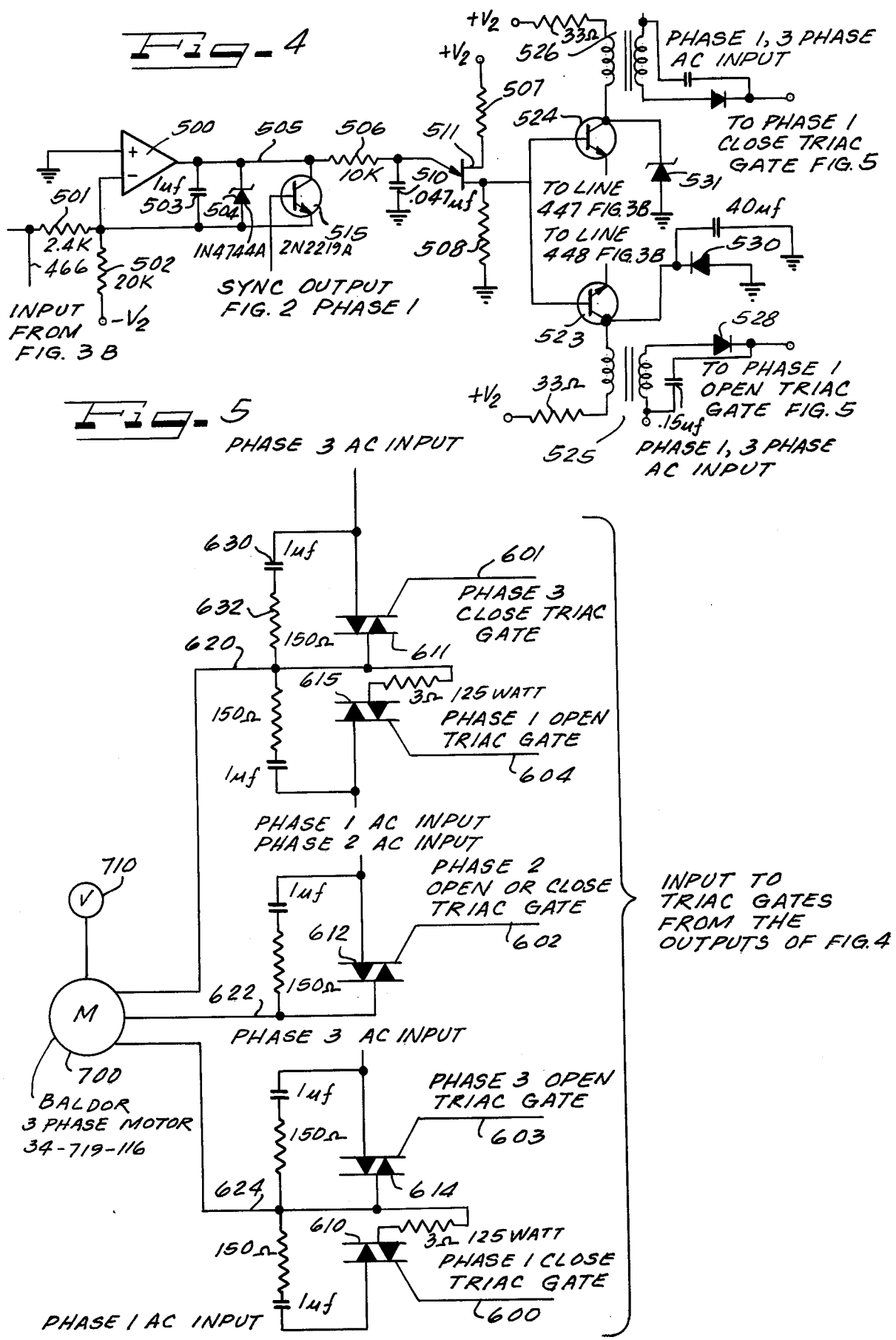

ELECTRONIC APPARATUS FOR POSITIONING AND USING AC MOTORS

SUMMARY OF THE INVENTION

This invention relates to electronic positioning systems and in particular to electronic control systems for valve actuators. The use of closed loop positioning systems is well known for purposes of controlling the settings of valves, or dampers, especially where a process is to be controlled.

At the present time, many actuators use DC motors, AC motors in conjunction with contactors for reversing, or hydraulic motors. It is an objective of the present invention to reduce maintenance. It is a further objective of the present invention to improve the speed and accuracy of positioning the valve. It is a further objective to minimize AC rotor currents due to starting the motor. It is a further objective to reverse motor direction without producing unnecessary motor transients. A further objective is to achieve fail-safe operation of the controller if the set point signal is inadvertently removed from the control system.

The present invention accomplishes these goals by controlling three-phase AC motors. Control is achieved by varying the firing angle of the power triacs in proportion with the position error signal for small errors. For large errors, the motor is run at maximum speed until the error signal reaches 2% of the maximum feedback range. Applied voltage is then reduced by decreasing the firing angle of the triacs in proportion to the error signal. An operational amplifier acting as a differentiator produces a velocity signal used to reverse the motor shortly before final position is reached.

These and other objects and advantages of this invention will be more readily apparent from the following detailed description of the preferred embodiment.

BRIEF DESCRIPTION OF THE DRAWINGS

FIG. 1 is a system block diagram;

FIG. 2 illustrates the three required synchronizing circuits;

FIG. 3A illustrates the input and summing point circuitry;

FIG. 3B illustrates the error translator;

FIG. 3C illustrates representative total error and translated error as a function of time;

FIG. 3D illustrates the error translator equivalent circuit with an input error having positive polarity;

FIG. 3E illustrates the error translator equivalent circuit with an input error having negative polarity;

FIG. 4 illustrates a typical phase, three required for three phase AC power of the triac gate voltage generator circuit; and FIG. 5 illustrates the triac power bridge.

DESCRIPTION OF THE PREFERRED EMBODIMENTS

FIG. 1 illustrates a block diagram of the preferred embodiment. It includes a desired position setpoint signal which is input on the line 5, a summing point 10. Current valve position is derived from the feedback potentiometer 15. An error translator circuit 20 takes the output of the summing point 10 and converts it to three signals, magnitude, open valve and close valve which appear on the lines 25. The magnitude, open valve and close valve signals provide inputs to the triac gate voltage generators 30 which also receive inputs from the three-phase synchronizers 40 which are in turn powered from a source of three-phase AC power 42. A triac bridge 45 controlled by the triac gate voltage generators 30 supplies controlled three-phase AC power to drive the motor 50 whose shaft is connected to the valve 55 and the shaft of the feedback potentiometer 15. A differentiator 60 is also present for the purpose of differentiating the position signal from the position feedback potentiometer 15 to make available a velocity signal at the summing point 10.

Referring now to FIG. 1, the desired position on the line 5 is fed into one port of the summing point 10. The feedback position signal 15 is fed into a second port. The output of the summing point 10 is an error signal which is proportional to the difference between the input and feedback signals. The error signal is input to the error translator 20. The output of the error translator 20, error magnitude and direction information is then fed to the triac gate voltage generators 30. As a second set of inputs, the three-phase synchronizers 40 supply low voltage pulses to the triac gate voltage generators. The triac gate voltage generators 30 produce three gate signals in any given 60 Hz cycle. These signals are synchronized with the three-phase AC power source 42. For small errors, the firing angle is proportional to the magnitude of the error signal. The outputs of the triac gate voltage generators 30 are input to the gates of the triac bridge 45. As the error signal increases, the outputs of the triac gate voltage generators occur earlier with respect to the AC power phase, thus altering the firing angle of the selected triacs. With greater errors, the selected triacs are turned on sooner in a given one-half cycle. For error greater than 2% of the maximum feedback range, the selected triacs are turned on fully and the motor 50 runs at maximum speed. As the error signal decreases below 2% of the maximum range, the outputs of the triac gate voltage generators 30 begin to change with respect to the AC power phase and the triacs in the triac bridge 45 are turned on later in a given cycle. At null, the triac bridge 45 supplies no current to the three-phase motor 50.

It should also be noted that triac gate voltage generators 30 carry out a reversal of the direction of the output torque of the three-phase AC motor 50 just before the desired position is reached. This stops the motor quickly without the use of a mechanical brake. The position feedback of the potentiometer 15 is differentiated by the differentiator 60 to produce velocity feedback which is used to create a synthetic null shortly before the real null occurs. When the synthetic null is detected, two of the phases to the motor are interchanged via the triac bridge 45. Since the phase switching is synchronized with the three-phase AC lines and since it occurs near final position, it occurs at a time of low speed and low voltage, the motor 50 is not subject to excessive transients.

FIG. 2 discloses the circuitry for a three-phase synchronizer. The three-phase synchronizer is composed of three identical circuits. The circuit for phase 1 is typical and consists of a step-down transformer 310, a current limiting resistor 320, a decoupling capacitor 330, the two diodes 370 and 380 which limit the reverse bias voltage applied respectively to the transistors 340 and 350, the output line 355 and the load resistor 360.

Referring now to FIG. 2 and the typical circuit for phase 1, the secondary of the low voltage isolation transformer 310 supplies AC voltage to be synchronized via the current limiting resistor 320 to the bases of transistors 340 and 350. One of the transistors 340 and 350 is almost always turned on. As a result, the sync signal on the line 355 is at approximately zero volts. However, as the input signal from the transformer 310 approaches a zero crossing, the conducting transistor will turn off when there is insufficient input voltage to maintain a forward bias on the conducting base-emitter junction. At that time and until the other transistor of the pair starts to conduct, in the next half-cycle, the output voltage rises on the line 355 to about ¾ to a volt producing a synchronizing pulse of width $0.3 \times 10^{-3}$ seconds. The diode clamps 370 and 380 serve merely to keep the reverse base-collector voltages in the transistors 340 and 350 from becoming so high as to damage the transistors.

FIG. 3A illustrates the input and summing point circuitry for the preferred embodiment. This circuitry consists of a source of desired position signal, either a potentiometer 400 or a process standard resistor 410, a high gain amplifier 430 whose purpose is to provide a source of constant voltage to drive the position feedback potentiometer 15, a summing amplifier 442 which sums the desired position input from the line 5, the feedback position from the potentiometer 15 and the velocity signal from the differentiator 700. It should be noted that two low voltage power supplies V1 and V2 are required in the preferred embodiment. Both supply plus and minus 15 volts nominal and both have independent commons. Power supply V1 provides power for the input and summing point circuitry. Power supply V2 supplies power for the rest of the logic and control circuitry. In FIG. 3, the common side of V1 is indicated by V1'. It will facilitate understanding to think of V1 as floating with respect to V2, the true ground.

With respect to FIG. 3A, input set points may be provided on the line 5 by potentiometer 400 or process standard resistor 410. In either case, the range of input voltages is 2 to 10 volts. The set point input also drives the inverting input of the operational amplifier 430 through the resistor 433. Since the input voltage on the line 5 is always greater than or equal to 2 volts, the output of the operational amplifier 430 is a constant minus 10 volts which is used to provide a reference voltage for the feedback potentiometer 15. Because the gain of the operational amplifier 430, set by the resistor 431 and 433 is high and the amplifier output is clamped, variations in the set point input 400 or 410 above 2 volts do not alter the minus 10 volt output of the operational amplifier 430. It is a important feature of this invention that if the set-point signal is lost for any reason such as a cut cable, the feedback signal also is lost simultaneously. Hence, the actuator is not driven to a fully opened or fully closed position as it would be in the case when the feedback signal was provided from an independent voltage source.

The input set point and feedback positions are summed in a known fashion at the junction of resistors 439, 440 and 441. The velocity feedback loop is being ignored for the time being. The summed error signal is amplified in a known fashion by the operational amplified 442 to produce a total error signal range ± 15 volts on the line 445. The total error signal indicates both magnitude of error and sign. Thus, it shows how far the valve should be moved and whether it should be opened or closed. Note that the total error signal is with reference to V1'.

The total error signal is the input to the error translator of FIG. 3B. The error translator takes the total error signal produced in FIG. 3A and separates it into three signals. It is in the error translator that the floating characteristic of V1 with respect to V2 is resolved. One output signal represents the Translated Error Magnitude. One effect of the error translator is to fold the positive portion of the total error signal on the line 445 along the time axis to produce a signal of the same magnitude but with a negative polarity with respect to V2 ground. A second effect of the error translator is to provide a reference with respect to V2 ground for the negative portion of the total error signal. The other two signals generated by the error translator represent close valve and open valve direction indicators.

Another way to think about the functioning of the error translator is that the voltage output on the line 446 is the negative absolute value of the input voltage on the line 445.

Another way to think about the functioning of the error translator is that it acts as a rectifier with respect to the total error signal. FIG. 3C illustrates an example total error signal with respect to V1' and the translated error magnitude with respect to V2 ground.

The error translator of FIG. 3B is composed of a pair of switching diodes 452 and 453 and a transistor 460 associated with a close valve output on the line 447 as well as a second pair of switching diodes 454 and 455 and a transistor 461 associated with an open valve output on line 448. The translated error magnitude is output on the line 446 to the triac gate voltage generators 30 of FIG. 1. The total error signal is input between the lines 445 and 449.

With respect to FIG. 3B, the grounds indicated are with respect to power supply V2. For purposes of explanation, operational amplifier 442 of FIG. 3A is reproduced in FIG. 3B as a signal generator whose polarity is measured with respect to V1'. Note also that V1' appears at the line 449. The capacitor 450 between V1' and V2 ground is for decoupling purposes only and does not affect normal operation of the error translator. The resistor 451 represents the equivalent resistive load to V2 ground that is due to the three triac gate voltage generators 30 of FIG. 1. Assume now that the voltage output of the generator 442 is positive with respect to V1. Thus, the relative voltage of the node composed of the generator 442, the diode 452 and the diode 453 is positive with respect to the node composed of the diode 454, the capacitor 450 and the diode 455. This causes the diode 453 to become reverse biased, hence, an open circuit. FIG. 3D represents the conducting portion of the circuit for this case. Note that a complete circuit is established with the output voltage at the line 446 now being negative with respect to V2 ground. In this case the diodes 454 and 452, along with the transistor 460, all conduct. The output of the transistor 460, the close valve signal, on line 447 is at ground. A ground on the line 447 enables the close triac gate generators 30. The negative voltage at the line 446 corresponds to the magnitude of the current positive position error. With a negative voltage on the line 449, the diode 455 is reverse biased, holding the transistor 462 off. Hence, the output of the transistor 462, the open valve signal, on the line 448 is high, inhibiting the open valve triac gate generators 30.

Assume now that the polarity of the operational amplifier 442 is reversed as indicated in FIG. 3E. In this case, the diodes 453 and 455 and transistor 462 conduct. A negative voltage appears across the resistor 451 with respect to V2 ground. Since the transistor 462 is conducting, its output, the open valve signal, line 448 is low enabling the open triac gate generators 30. Conversely, due to the negative voltage at the line 446, the diode 452 and the transistor 460 are held off. The close valve signal, line 447 is high inhibiting the close triac gate generators 30.

FIG. 4 discloses a typical triac gate voltage generator circuit which is used to control the turning on of a selected triac during a given one-half 60 Hz cycle.

Since three-phase AC power is disclosed for the preferred embodiment, three triac gate voltage generator circuits are required. Each of these three is identical to the circuit of FIG. 4. Each of the three receives a common input from the line 446 of FIG. 3B. This is the translated error magnitude signal. Each of the three circuits of which FIG. 4 is a typical one receives an input from a synchronizing circuit shown in FIG. 2. Thus, the synchronizing output for phase 1 shown at the line 355 provides the input to the base of the transistor 515 in FIG. 4. There is a corresponding connection between the additional two triac gate voltage generator circuits and the synchronizing circuits for phases 2 and 3 in FIG. 2. With respect to FIG. 4, each of the triac gate voltage generator circuits consists of an integrator composed of the operational amplifier 500, the resistors 501 and 502, the integrating capacitor 503 connected between the output and the input of the operational amplifier 500 and a clamp diode 504 also connected between the output of the operational amplifier 500. The integrated output on the line 505 supplies input power to a standard unijunction transistor oscillator composed of the resistors 506, 507, 508, the timing capacitor 510 and the unijunction transistor 511. At the beginning of each one-half cycle for a given phase, the integration capacitor is discharged by the synchronizing pulse through the transistor 515 for initialization purposes. The base input to the transistor 515 is supplied on line 355 of the synchronizing circuit for phase 1 as shown by FIG. 2. The current so supplied saturates the transistor 515 of FIG. 4 causing the integration capacitor 503 to be discharged and establishing an initial condition.

The output from the unijunction oscillator on the line 512 provides base input to two transistors 523 and 524. The emitters of the transistors 523 and 524 are grounded or held high by the close valve inhibit and open valve inhibit signals generated at the lines 447 and 448 of FIG. 3B. It is in transistors 523 and 524 that the polarity is reassociated with the error magnitude generated on the line 446 which is the input to the three integrators, one of which is indicated in FIG. 4. The transistors 523 and 524 implement the gates and either the primary of the pulse transformer 525 or 526 is pulsed. A gate signal is then generated at the secondaries of the pulse transformer 525 or 526 which turns on the gate of the appropriate triac in FIG. 5 causing the motor to turn in the selected direction.

Referring to FIG. 4, the operational amplifier 500, the resistors 501, 502 and the capacitor 503 form an integrator. The output signal from the error translator on the line 446 of FIG. 3B provides the input to each of the three triac gate voltage generator circuits. As this input signal is negative, the output of the integrator is a positive-going signal. The Zener diode 504 clamps the integrator output to prevent saturating the operational amplifier. The ramp voltage output of the operational amplifier 500 has a slope directly proportional to the magnitude of the input error voltage. The integrated error voltage provides drive current for a standard unijunction oscillator composed of the resistors 506, 507, 508, the capacitor 510 and the unijunction transistor 511.

The operation is as follows. Once each one-half 60 Hz cycle, a synchronizing signal appears on the line 355 of the synchronizing circuit of FIG. 2 of synchronizer 40 and is coupled to the base of the transistor 515. The purpose of the synchronizing signal is to set the initial condition on the integrating capacitor 503 to zero by causing the transistor 515 to conduct. Once the synchronizing signal terminates, the transistor 515 becomes biased off and the integrator 500 starts producing a ramp whose slope is proportional to the input error signal. The integrated output charges the unijunction timing capacitor 510 through the resistor 506. When the voltage at the emitter of the unijunction 511 reaches the firing point, the unijunction transistor conducts, producing a series of pulses at the output resistor 508. It is this string of pulses on the line 512 which is ultimately coupled to the gate of a selected triac. The first pulse of a series is the one which triggers a given triac.

The appropriate triac gate for a given phase is first selected using the transistors 523 and 524 in conjunction with the close valve inhibit and open valve inhibit signals generated by the error translator at lines 447 and 448, FIG. 3B. The direction signal which is grounded determines which of the transistors 523 or 524 will conduct. The conducting transistor produces a pulse on the primary side of the pulse transformer 525 or 526. The voltage generated at the secondary of the appropriate pulse transformer is rectified the appropriate diode 527, 528 and is then coupled to the gate of the appropriate triac on the triac bridge 45, FIG. 1, causing that particular triac to conduct. Zener diodes 530 and 531 clamp the turn-off inductive transient at the collectors of the transistors 523, 524 so as not to damage those transistors.

The triac bridge disclosed in FIG. 5 is composed of five triacs as well as some suppression resistors and capacitors. If one only wanted to open the valve, the triacs 602, 603 and 604 would be needed. Each gate input for said three triacs would be driven by the open valve side of a pulse transformer secondary as indicated in FIG. 4. To close as well as open the valve 710, the motor 700 must be capable of reversal. To achieve reversal of a three-phase motor, two changes are interchanged. This is accomplished in FIG. 5 by adding the triacs 600 and 601. The gate inputs to these triacs are driven by the secondaries of pulse transformers associated with the close valve signal as indicated in FIG. 4. Phase 2 of FIG. 5 is pulsed on the line 602 whether the valve 710 is to be opened or closed.

With respect to FIG. 5, to cause the motor 700 to close the valve 710, gate pulses are applied on the lines 600, 601 and 602 by the selected triac gate voltage generator circuits. This causes the triacs 610, 611, 612 to conduct producing controlled three-phase AC on the output lines 620, 622, 624 which are connected to the motor 700. To open the valve, pulses are supplied on the lines 602, 603 and 604. These pulses cause the triacs 612, 614 and 615 to conduct. As can be seen, phases 3 and 1 have been interchanged in this process. RC networks composed of a capacitor 630 and a resistor 632 appear across each triac for purposes of suppressing transients. The values of the capacitor 630 and the resistor 632 are chosen to provide suppression and some filtering at very low firing angles. That is, when the triacs conduct only for a very brief time during a given cycle.

It should be noted that as the error signal decreases below 2% of maximum feedback range, the firing angle of the triacs decreases linearly reducing the effective voltage applied to the motor. This results in two benefits. First, if a valve is to be fully closed, since output torque of the AC motor is proportional to the square of the applied voltage, the set point may be positioned so that the valve may be driven shut with a known amount of torque. Secondly, since in the 0-2% range of the maximum error signal the applied voltage is proportional to the error, the motor is not subject to large transients due to fully applying the AC voltage with a stationary rotor. For processes that vary slowly, full voltage may not be applied for extended operating intervals. This also minimizes thermal and mechanical stress on the motor.

The preceding discussion disclosed how the preferred embodiment responded to position feedback. Velocity feedback is also sensed and is used to produce regenerative braking. With respect to FIG. 3A, the operational amplifier 700 in conjunction with the capacitor 701, and resistors 702, 703 and 704 form a differentiator. The input to this differentiator comes from the position feedback potentiometer 15. Thus, the differential signal is the velocity with which the drive motor is moving. The velocity feedback is subtracted from the current position error at the operational amplifier 442 through resistor 706 using standard techniques. The effect of the velocity feedback is to cause the position error to appear to be zero slightly before it is so in reality. The result is that the output of operational amplifier 442 changes sign as the actuator approaches the desired final position. The sign change at that time causes two phases of the three-phase AC input voltage to the motor to be interchanged thus reversing the motor torque. This torque reversal causes a decrease in motor velocity thus reducing the velocity feedback signal. The result is that the actuator stops at its desired final position without over-shoot or need for a mechanical brake.

It will be apparent to those skilled in the art that many modifications and variations may be effected without departing from the spirit and scope of the novel concepts of the present invention.

I claim as my invention:

1. A solid-state valve actuator control system suited for use with AC motor means comprising a control input terminal, a differentiator, integrator means, a summing point, AC power input terminals, means to synchronize the start of integration of said integrator means with respect to the zero crossings of AC power input via said AC power input terminals, controllable oscillator means, AC solid-state switch means, AC motor means mechanically coupled to valve means, and position feedback means mechanically coupled to said valve means; said summing point having a first input connected to said control input terminal, a second input connected to said position feedback means, a third input connected to the output of said differentiator; said differentiator having its input connected to the output of said position feedback means; said summing point output being connected to said integrator means, one of which corresponds to each phase of AC input connected to said AC power input terminals; said integrator means being initialized by zero crossings of each of said phases of AC by said synchronizing means; said synchronized outputs from said integrator means each being connected to the corresponding control input of said controllable oscillator means; said synchronized output of said oscillator means being connected to the control inputs of a plurality of said AC solid-state switch means, each of said AC switch means having a power input connected to one of said AC power input terminals; said AC solid-state switch means having as an output corresponding phases of controlled AC to drive said AC motor means in the direction and at the rate selected by said output of said summing point.

2. The control system according to claim 1 wherein said AC power input terminals comprise three AC power input terminals corresponding to three-phase AC input power.

3. The control system according to claim 2 wherein said AC solid-state switches are triac switches and wherein said AC motor means is a three-phase AC motor and wherein said AC power outputs of said AC switches are connected such that reversal of said AC motor is dictated by the polarity of said summing point output and is accomplished by electronically interchanging two of said phases of said three-phase AC motor by means of said triac switches.

4. The control system according to claim 3 wherein said differentiator output signal is subtracted from said position feedback signal so as to create a synthetic null hence regeneratively braking said three-phase AC motor.

5. A solid-state valve actuator control system using three-phase motors as prime movers comprising a set point input terminal, a differentiator, a summing point, integrator means, AC power input terminals, synchronizing circuits to start said integrators integrating, a three-phase AC motor, a plurality of triac switches having their power inputs connected to said AC power input terminals, and their power outputs connected to said three-phase AC motor, said three-phase AC motor being mechanically connected to valve means, and position feedback means mechanically connected to said valve means; said summing point having one input connected to said set point input terminal, a second input connected to said feedback means, a third input connected to the output of said differentiator, the input to said differentiator being connected to said position feedback means, said summing point having an output connected to each of said integrators; said integrator outputs providing control signals to gate inputs of said triac switches operable so that the controlled three-phase AC output from said triac switches causes said AC motor to generate a torque in the direction required by the polarity of said summing point output signal; the magnitude of said output signal resulting in said controlled three-phase AC output being proportional to said set-point error signal when said error signal has a magnitude below a pre-selected value, and maximum controlled three-phase AC output being applied to said motor for larger magnitudes of said output signal.

6. The control system according to claim 5 wherein said pre-selected value is equal to 2% of maximum feedback range.

7. The method of positioning a valve by the steps of first continually summing a desired input position signal, a position feedback signal and a velocity feedback signal in a summing point and producing as a summing point output a signal containing error magnitude and polarity, secondly driving an AC motor connected to a valve by applying full AC voltage and current to the motor causing the motor to turn in the direction specified by the polarity of the summing point output until the magnitude of said summing point output signal decreases to a pre-selected value, thirdly driving said motor with AC voltage and current proportional to the magnitude of the summing point output signal, fourthly using velocity feedback to zero the summing point output signal shortly before true desired position is reached causing a reversal of torque of said AC motor resulting in the motor stopping at desired position without the need for a mechanical brake; wherein on startup or reversal said motor is not subject to electrical and thermal stresses due to the step of applying to the motor controlled AC voltage and current proportional to the magnitude of the summing point output signal.

8. The method of claim 7 wherein additionally fail-safe operation is provided in cases of losing the position feedback signal by deriving the reference voltage for the input position signal from the output of an amplifier whose input is supplied by the position feedback signal.

9. The method according to claim 8 wherein the pre-selected value of summing point output signal at which the full AC voltage and current starts to be reduced to provide controlled AC voltage and current is equal to 2% of maximum feedback range.

10. The method according to claim 7 wherein upon commanding the motor to fully close the valve, the valve may be closed with a known amount of torque by providing the controlled AC voltage in the proportion range in proportion to the output of the summing point and providing the output torque of the motor in proportion to the square of the applied voltage.

11. A solid-state valve actuator control system comprising a source of input position signal, a summing point, a plurality of AC solid-state switches, an AC motor mechanically connected to a controlled device, a source of position feedback mechanically connected to the controlled device and a source of velocity feedback connected to the output of said position feedback; said summing point operable to sum said input position signal, said position feedback signal and said velocity feedback signal to continually produce an error signal, said error signal providing input to said plurality of AC solid-state switches operable to produce controlled AC output from said switches to drive said AC motor in a direction specified by the polarity of said error signal and with full AC applied to said motor when the magnitude of said error signal is greater than a pre-selected value and proportional AC being applied to said motor when the magnitude of said error signal is less than a pre-selected valve; wherein said velocity feedback zeros the error signal shortly before time desired position is reached causing a reversal of torque of said AC motor resulting in the motor stopping at desired position without the need for a mechanical brake.

12. A solid-state valve actuator control system comprising a source of input position signal, a summing point, a plurality of AC solid-state switches, a valve, an AC motor mechanically connected to said valve, a source of position feedback mechanically connected to said valve and a source of velocity feedback connected to the output of said position feedback; said summing point operable to sum said input position signal, said position feedback signal and said velocity feedback signal to continually produce an error signal, said error signal providing input to said plurality of AC solid-state switches operable to produce controlled AC output from said switches to drive said AC motor in a direction specified by the polarity of said error signal and with full AC applied to said motor when the magnitude of said error signal is greater than a pre-selected valve and proportional AC being applied to said motor when the magnitude of said error signal is less than a pre-selected valve; wherein said velocity feedback zeros the error signal shortly before time desired position is reached causing a reversal of torque of said AC motor resulting in the motor stopping at desired position without the need for a mechanical brake.

* * * * *